Figure 1:
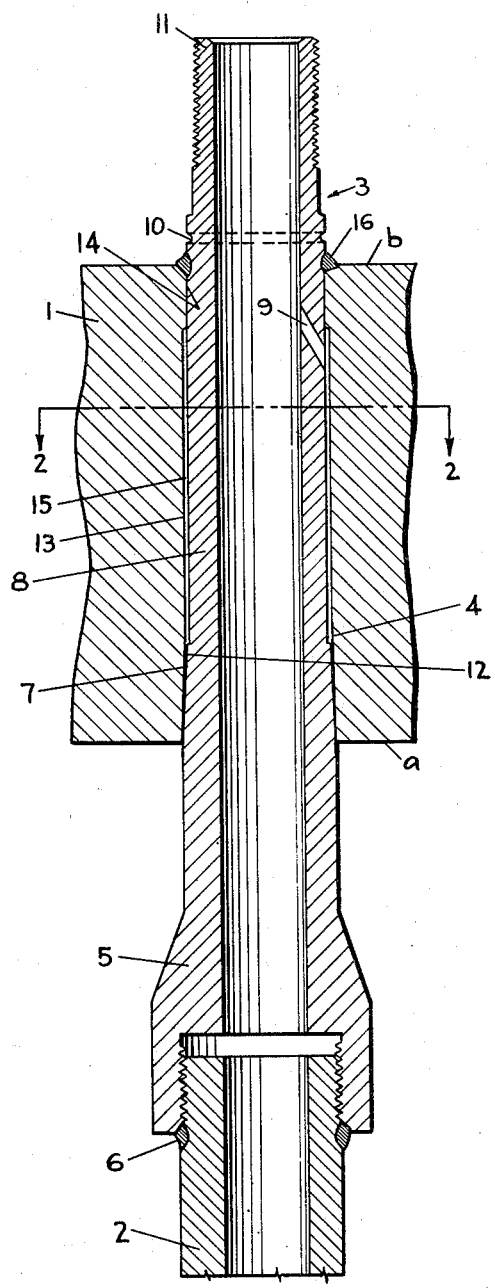

April 16, 1957  C. G. VAN DE WATEREN  2,788,994
PIPE SECURED TO PLATE WITH SEALING MEANS EFFECTIVE
AGAINST HIGH PRESSURE AND TEMPERATURE CHANGE
Filed March 4, 1950

INVENTOR:
CORNELIUS GERHARDUS VAN DE WATEREN
BY: *Oswald H Milmore*
HIS ATTORNEY

United States Patent Office 2,788,994
Patented Apr. 16, 1957

2,788,994

PIPE SECURED TO PLATE WITH SEALING MEANS EFFECTIVE AGAINST HIGH PRESSURE AND TEMPERATURE CHANGE

Cornelius Gerhardus van de Wateren, The Hague, Netherlands, assignor to Shell Development Company, San Francisco, Calif., a corporation of Delaware Application March 4, 1950, Serial No. 147,608

Claims priority, application Netherlands March 11, 1949

8 Claims. (Cl. 285—192)

The invention relates to the art of fastening pipe ends in a plate or tube sheet, and is, for example, applicable for connecting tubes to tube sheets which form closures for high pressure vessels. Vessels of this type must frequently be fitted with cooling or heating pipes or coils when employed as reaction vessels for carrying out various chemical reactions, and these pipes or coils must have their ends brought through openings in a plate forming a wall of the vessel such as a removable closure plate.

Such plates are variously known as pipe plates or tube sheets and frequently have considerable thickness. Difficulty has heretofore been experienced in sealing such a pipe to the tube sheet, particularly when the vessel is subjected to high pressure.

This difficulty is aggravated as the thickness of the tube sheet is increased, and at higher temperature differences between the tube and the tube sheet such as would, for example, be caused by circulating a heating or cooling fluid through the tube. Further, the testing of the connection to detect leaks has heretofore been difficult, and it has been the general practice to test the connection between the tube and tube sheet by subjecting the vessel to pressure after the tube sheet is emplaced thereon.

An object of this invention is to provide an improved connection between a tube sheet and a tube passing through the sheet wherein effective sealing is attained by simple means. A further object is to provide an improved connection which may be easily tested, and wherein each connection can be tested individually.

Another object is to provide an improved method of connecting a tube in a tube sheet and of testing such connection.

In view of the great thickness of the tube sheet, which may be from about two to five times the thickness of the tube diameter, the realization of such a sealing requires special precautions in connection with possible differences in temperature between the tube and the tube sheet, such as may arise, if the high pressure vessel is used as a reactor, when the chemical reaction takes place and a thermal heating or cooling fluid is circulated through the tubes. The invention will be described as applied to a connection between a thick tube sheet forming a cover plate of a high pressure reactor and the termini of a heat-transmission element, such as a U-shaped tube or a coil located with the vessel and having the termini thereof extending through bores in the tube sheet. The two termini are parallel and extend through parallel bores of identical construction; hence, only one of the connections will be described.

According to the present invention the bore in the tube sheet is flared or widened conically on one side of the tube sheet, preferably on the high pressure side, to provide a conical seat having a small taper, having an included angle which is usually less than about 7°, and corresponding to a conical enlargement in the external wall of the tube of a similar, preferably slightly greater taper, e. g., from ½ to 3° greater; the other side of the tube sheet is secured to the tube by any suitable means to place the part of the tube lying between the two sides of the sheet under tensile stress. In the preferred embodiment such connection on the said other side of the sheet is made by means of a welded joint.

The termini of the tubular heat-transmission element which extend through the tube sheet may be integral with the main part of the element which is within the vessel or may be separate extension pieces which are screwed, welded, or screwed and welded to the main part. The use of separate extension pieces will be described in this specification and is preferred in most instances because it facilitates the accurate fitting of the finished conical seats or enlargements; thus these tubular extension pieces can be carefully machined or ground to fit the bore and thereafter connected to the main part of the heat-transmission element.

The present invention also provides a method for testing each connection individually for tightness under high pressure immediately after it has been made so that possible imperfections can be detected and repaired. This prevents such leaks from remaining undiscovered until the whole high pressure vessel has been assembled and tested—a contingency which would demand total or partial dismantling of the vessel or pipes. This testing is made possible by providing a clearance between the tube and bore in the tube sheet between the two walls of the latter and a small test channel or passageway in the tube wall communicating with the clearance, through which a pressure test fluid can be admitted.

Figure 2:
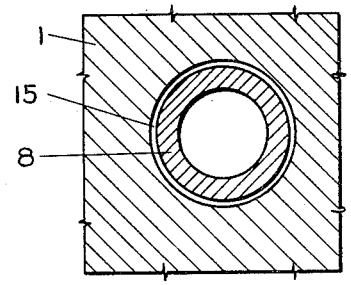
Figure 3:
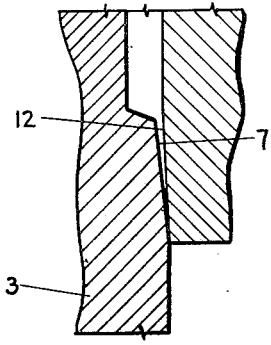

The invention will be further described by way of example in connection with the accompanying drawing forming a part of this specification, wherein Fig. 1 is a sectional view taken along the axis of the tube; Fig. 2, transverse sectional view taken on line 2—2 of Fig. 1; and Fig. 3 is a detail view of the conical seal, the tapers being exaggerated to indicate their relation.

Referring to the drawing in detail, 1 represents the metal pipe plate or tube sheet of a high pressure reaction vessel. This sheet may be a removable closure and forms an outer wall of the vessel; the side *a* is directed toward the inside of the vessel and is at a higher pressure than the outer side *b*. A plurality of metal heat-transmitting elements, i. e., heating or cooling pipes of U-shape or of some other shape, are mounted on the sheet 1 and have the main portions thereof within the vessel; only a portion 2 of one of such pipes is shown in the drawing. Each end of the heating or cooling pipe is provided with a metallic tubular extension 3 that passes through a bore 4 in the sheet and is sealed to it by the arrangement to be described.

The extension piece 3 has the following parts: a foot 5, somewhat enlarged and internally threaded, into which one of the ends 2 of the heat transmission pipe is screwed, the connection being finished by welding as indicated at 6; a conical enlargement 7 (i. e., enlarged with respect to the main body part 8 lying outwardly from the side *a* of the sheet); and a small test channel or passageway 9 piercing the tube wall obliquely. Optionally, there are provided an annular groove 10 located a short distance beyond the face *b*, and an externally threaded dead head 11 beyond the groove.

The bore 4 comprises three parts: first, a conical seat 12 at one end, where the bore is flared or widened toward the mouth of the bore by countersinking; a second, a cylindrical intermediate part 13 the diameter of which is such that the uppermost part of the extension piece 3 can pass easily through the bore; and, third, a cylindrical part 14 at the other end of the bore which fits exactly about the corresponding part of the extension piece 3. It is evident that the intermediate portion of the tubular extension piece 3 between the tapered enlargement 7 to the other side b of the plate is longitudinally free with respect to the plate. The relation between the diameter of the intermediate part 13 and that of the main body part 8 of the extension piece is such as to leave an annular clearance 15. While such a clearance may be provided by suitably shaping either the extension piece 3 or the bore or both, it is preferred to make the extension piece of uniform diameter from the top of the enlargement 7 to the groove 10 and to counterbore the bore 4 from the bottom.

The taper of the seat 12 differs from and is slightly less than that of part 7; for example, the former may have an included apex angle of 4° while the latter has an included apex angle of 6°.

Sealing is effected by the conical enlargement 7 of the extension piece and the countersunk seat 12 of the bore in the tube sheet. The components are drawn one into the other by applying tension to the upper part of the extension piece. During assembly such tension may be applied by connecting a threaded nut to the threads of the dead head 11 and applying a pulling force to the said nut by a suitable implement outwardly with respect to the face b of the tube sheet in a manner to be described. The force should be so chosen as to obtain an effective sealing between the conical seat 12 and the conical enlargement 7, which undergo deformation of their contact surfaces to beyond the limit of elasticity.

The extension 3 is secured to the sheet 1 at or near the surface thereof remote from the seat 12 by any suitable means to produce a permanent tensile loading on the extension piece. Thus, while the extension piece is held under tensile stresses through the dead head 11 the extension piece may be welded at the outer face b as indicated at 16, such weld preferably extending completely about the extension. After the outer end of the extension is thus secured the pulling force exerted on the dead head may be removed; the connection is then permanently loaded by the weld.

Such lengthening of the extension piece 3 relative to the thickness of the sheet 1 as may occur as a result of differences in temperature between the tube and sheet will not significantly affect the sealing because a longitudinal extension results in an elastic radial contraction of the wall of the seat 12 about the cone 7. Owing to the very slight degree of tapering a comparatively great difference in temperature between the extension piece 3 and the sheet 1 can be tolerated without causing leakage through the conical closure.

The mounting of the tubes in the tube sheet can be carried out as follows:

The tube sheet is so mounted horizontally on a suitable frame in the position indicated in Fig. 1 at a height to provide sufficient room on the lower side of the sheet to allow the heat-transmission pipe or coil with the extension pieces 3 connected thereto to be placed beneath it. The pieces 3 are then inserted upwardly into their respective bores 4 in the sheet.

After this, a yoke (not shown) is fastened by means of screw nuts (likewise not shown) to the free, protruding ends 11 of the two extension pieces forming a part of the same heat-transmission pipe. The necessary upward force can then be applied in various ways, for example, by means of a crane and a spring balance which indicates the load.

Both extension pieces are then welded at 16. The force is maintained until the joint and the surrounding material have cooled; yoke and nut may then be removed.

The seal is then tested by subjecting the interior of the heat-transmission pipe to high pressure, e. g., by admitting air or other gas as a test fluid. For this one of the extensions can be sealed off by a cap and a suitable coupling attached to the other extension of the same pipe. The pressure is transmitted through the channel 9 into the clearance 15 and any leakage can be immediately ascertained by covering the welds and conical connections with, for example, soapy water. The pressure is then removed.

If no leakage appears in the foregoing test the dead head 11 is cut off at the groove 10, and the testing channel 9 is plugged and welded tight. The tube sheet is then attached to the reaction vessel.

Should a crack arise in the joint 16 while the high pressure reactor is in operation, the sealing remains unaffected, as it is mainly due to the conical parts, while the welding joint serves primarily to insure compression stress on the contact surfaces of the conical parts 7 and 12.

A cap, or similar device (not shown), is fitted in a known manner to the exterior of the tube sheet, with connections for the supply and discharge of the fluid medium which is to be passed through the heat-transmission pipes.

I claim as my invention:

1. A connection between a plate and a tube passing through said plate comprising: a thick plate having a bore passing between opposite sides thereof, said bore having a conical enlargement of circular cross section near one side of the plate widening toward the said side with an included apex angle less than about 7° and forming a seat; a tube with an external diameter less than the thickness of said plate extending through said bore, said tube having a central passage passing entirely through the tube between opposite sides of the plate for conducting fluid through the plate; a conical external enlargement of circular cross section on said tube having an included apex angle exceeding the apex angle on said seat by a small angle that is not greater than 3°, said enlargement widening toward said one side of the plate and being in peripheral sealing engagement with said seat only near said one side of the plate; and a weld at the other side of the plate securing said tube, the said weld extending peripherally about the tube and being affixed to the tube at a position thereon to maintain the intermediate portion of the tube between the peripherally engaged part of the enlargement and the weld under tensile stress, thereby to place compressive stress between said seat and the said peripherally engaged part, and said intermediate portion of the tube being longitudinally free from the plate.

2. A method of making a connection between a single plate and a tubular body extending through the plate, said plate having a bore passing through the plate between opposite sides of the plate with a tapered enlargement near one side of the plate widening toward the said side and forming a seat and said tubular body having an internal passage extending through the body for conducting fluid through the plate and a tapered external enlargement adapted to engage said seat perpiherally, the part of the body from the peripheral engagement with the plate to the other side of the plate being longitudinally free with respect to the plate, comprising the steps of: inserting the tubular body through said bore from said one side of the plate to the other to bring said tapered enlargement on the body into said peripheral with said seat only near said one face of the plate, said body projecting outward beyond the other side of the plate; applying an external pulling force to the projecting part of the tubular body with respect to the plate sufficient to elongate the intermediate portion of said tubular body that is situated within the bore between the peripherally engaged part of the enlargement and the said other side of the plate and sufficient to deform said peripherally engaged part beyond the elastic limit; welding the tubular body to the other side of the plate while maintaining said pulling force; and removing the external pulling force, whereby the said intermediate part of the tubular body is permanently subjected to tensile stress and said peripherally engaged part is permanently subjected to compressive stress against the said seat on the plate.

3. In combination with the steps according to claim 2, the added step of cutting off the projecting end of the tubular body beyond the weld.

4. In combination with the steps according to claim 2, wherein the part of the bore intermediate to the sides of the plate has a diameter greater than the external diameter of the contiguous portion of the tubular body to form an annular clearance, the added steps of introducing a pressure test fluid into the said annular clearance from the said internal passage of the tubular member through a channel extending through the wall of said member, and testing the places at which the body issues from the plate to ascertain whether the pressure test fluid escapes.

5. In combination with the steps according to claim 4, the added steps of removing the test fluid and closing off the said channel in the tubular body.

6. A connection between a plate and tubular body passing through said plate comprising: a metal plate having a bore passing between opposite sides thereof, said bore having a tapered part near one side thereof widening toward said side and forming a seat; a tubular metal body extending through said bore and having an internal passage extending entirely through the body between opposite sides of the plate and adapted to conduct fluid through the plate, said plate having a thickness at least twice the external diameter of said tubular body and the said tapered part having a small apex angle such that the apex is situated beyond the other side of the plate; a tapered external enlargement on said tubular body toward said one side of the plate and having an apex angle slightly larger than the said apex angle of the tapered part of the bore for direct peripheral metal-to-metal sealing contact with said seat near said one side of the plate only through a short distance relative to the thickness of the plate; and securing means providing firm all-metal support between the said other side of the plate and the part of the tubular body situated at the said other side, the said securing means being affixed to the tubular body at a position thereon to maintain the intermediate portion of the tubular body between the peripherally engaged part of the enlargement and the said securing means under longitudinal tensile stress, thereby to place compressive stress between said seat and the said peripherally engaged part, said intermediate portion of the tubular body being longitudinally free from the plate.

7. A connection according to claim 6 wherein said securing means is a weld directly connecting the said other side of the plate to the contiguous, external face of the tubular body.

8. A connection according to claim 7 wherein the tubular body has a dead head protruding beyond the said other side of the plate and beyond the said weld, said dead head having engaging means whereby tension may be placed on the tubular body while applying said weld and a localized section of reduced cross sectional area at the end of the dead head near the weld at which the dead head can be severed.

References Cited in the file of this patent

UNITED STATES PATENTS

| | | |
|---|---|---|
| 498,465 | Durr | May 30, 1893 |
| 816,155 | Dean | Mar. 27, 1906 |
| 899,582 | Weston | Sept. 29, 1908 |
| 1,333,372 | Barrow | Mar. 9, 1920 |
| 1,541,725 | Martin | June 9, 1925 |
| 1,636,057 | Jones | July 19, 1927 |
| 2,084,439 | Hamer | June 22, 1937 |
| 2,084,952 | Field | June 22, 1937 |
| 2,186,185 | Walker | Jan. 9, 1940 |
| 2,289,271 | Kane et al. | July 7, 1942 |
| 2,313,308 | Allen | Mar. 9, 1943 |
| 2,331,932 | Rowand | Oct. 19, 1943 |
| 2,342,025 | Watter | Feb. 15, 1944 |

FOREIGN PATENTS

| | | |
|---|---|---|
| 541,584 | Great Britain | Dec. 2, 1941 |